United States Patent [19]
Kimura et al.

[11] Patent Number: 5,674,016
[45] Date of Patent: Oct. 7, 1997

[54] VIBRATION DRIVEN PRINTING APPARATUS WITH SHEET DELIVERY MECHANISM

[75] Inventors: Atsushi Kimura, Yokohama; Hiroyuki Seki, Urawa, both of Japan

[73] Assignee: Canon Kabushiki Kaisha, Tokyo, Japan

[21] Appl. No.: 452,156

[22] Filed: May 26, 1995

Related U.S. Application Data

[62] Division of Ser. No. 380,141, Jan. 27, 1995, Pat. No. 5,464,291, which is a continuation of Ser. No. 28,132, Mar. 9, 1993, abandoned.

[30] Foreign Application Priority Data

Mar. 10, 1992 [JP] Japan .................................. 4-051614

[51] Int. Cl.$^6$ .................................................. B41J 23/32
[52] U.S. Cl. ................................................. 400/185; 400/625
[58] Field of Search ................................. 400/185, 314, 400/314.1, 625, 322

[56] References Cited

FOREIGN PATENT DOCUMENTS

| 0145176 | 8/1984 | Japan | 400/185 |
| 0018279 | 1/1987 | Japan | 400/187 |
| 0212575 | 9/1988 | Japan | 400/625 |

*Primary Examiner*—Christopher A. Bennett
*Attorney, Agent, or Firm*—Fitzpatrick, Cella, Harper & Scinto

[57] ABSTRACT

A printing apparatus is provided. A vibrator comprising an elastic member and an electric/mechanical energy converting device jointed to the elastic member is attached to a carriage on which a printing head is mounted. The vibrator generates a progressive vibrating wave. The vibrator is partially come into frictional contact with a rail-shaped stator and moves along the rail-shaped stator by the progressive vibrating wave. An object to be driven is frictionally come into contact with a portion of the vibrator which is not in contact with the rail-shaped stator. The object to be driven is driven by the progressive vibrating wave. By providing a motion converting mechanism for the carriage, driving operations other than the carriage feeding operation are also executed by the vibrator.

6 Claims, 13 Drawing Sheets

VIBRATION DRIVEN PRINTING APPARATUS WITH SHEET DELIVERY MECHANISM

This application is a division of application Ser. No. 08/380,141, filed Jan. 27, 1995, now U.S. Pat. No. 5,464, 291, which is a continuation of application Ser. No. 08/028, 132, filed Mar. 9, 1993, now abandoned.

BACKGROUND OF THE INVENTION

1. Field of the Invention

The present invention relates to a printing apparatus using a vibration driven linear motor to feed a carriage.

2. Related Background Art

As a printing apparatus using a vibration driven motor, hitherto, there is a thermal jet type (refer to U.S. Pat. Nos. 4,723,129 and 4,740,796) as shown in FIG. 16. According to such a printing apparatus, an ink tank 12 is put on a carriage 4, an ink is spouted out from a printer head 13, and the ink is printed onto a sheet fed from a platen roller 14. In the printing apparatus, as a drive source to linearly feed the carriage 4, there is used a vibration driven motor of the type such that a vibrator 1 rectilinearly moves on a rail-shaped stator 8 by means as shown in JP-A-H3-93481.

A printing apparatus as shown in FIG. 17 has also been proposed in order to improve a sheet feeding precision and to make a thickness of the printing apparatus thin. Reference numerals 2 and 3 denote vibrators to feed a sheet. A sheet 16 is sandwiched by two vibrators 2 and 3 with a proper pressing force as shown in FIG. 17. A progressive bending vibration is formed in each of the vibrators 2 and 3. A spatial phase difference between those travelling waves is set to 180°. Due to this, the bending vibrations of the vibrators 2 and 3 progress in a manner such that the convex portions always face the sheet 16 side. When an attention is paid to a mass point 2a of, for instance, a convex portion of the surface of each of the vibrators 2 and 3, the mass point 2a performs an elliptic motion. For instance, in FIG. 18, when an attention is paid to the vibrator 2, in the case where the travelling wave moves to the right as shown by an arrow 26, the mass point 2a performs a clockwise elliptic motion as shown in the diagram. Therefore, the moving direction of the mass point 2a of the convex portion of each of the vibrators 2 and 3 is opposite to the travelling direction of the vibration and such a motion acts as a transfer force to transfer the sheet 16. Although the vibrators 2 and 3 have two straight portions, since the directions of the transfer forces of the two straight portions are opposite, the sheet is fed by using the straight portion of one side. In the printing apparatus of FIG. 17, the sheet 16 is fed in the direction shown by an arrow in the diagram and is printed.

In the printing apparatus of the type such that the sheet is fed by the platen roller 14 as shown in FIG. 16, an electromagnetic motor to rotate the platen roller 14 is coupled with a feed roller in the paper feed mode and the sheet is automatically fed (not shown). However, the printing apparatus to feed the sheet by using the vibration driven motor as shown in FIG. 17 doesn't have an automatic document feeder.

In such a printing apparatus, the sheet cannot be also fed up to the end. That is, even when up to an arc portion of the vibrator is used to drive, a drive force in the arc portion is directed in the direction shown by an arrow in FIG. 19. Therefore, the sheet 16 can be fed up to an A portion and the sheet is sandwiched by two vibrators and is not delivered.

In the printing apparatus of the ink jet type, further, a recovering operation to suck out the ink is needed before printing so that the ink is not choked. In the printing apparatus of FIG. 16, such a recovering operation is performed by using the electromagnetic motor to rotate the platen roller 14 (not shown). However, the printing apparatus of FIG. 17 cannot perform such a recovering operation.

SUMMARY OF THE INVENTION

It is an object of the present invention to solve the above problems and to provide a printing apparatus in which an automatic paper delivery or an automatic paper feeding can be executed by using the operation of a vibration driven motor or an actuator to feed a carriage without using any special actuator.

Another object of the invention is to provide a printing apparatus of a simple construction and low costs.

According to one aspect of the present invention, there is provided a printing apparatus which is constructed as follows. A vibrator comprising an elastic member and an electric/mechanical energy converting device joined to the elastic member is attached to a carriage on which a print head is mounted. The vibrator generates a progressive vibration wave. A part of the vibrator is come into frictional contact with a rail-shaped stator and the vibrator moves along the rail-shaped stator by the progressive vibration wave. An object to be driven is come into frictional contact with a portion of the vibrator which is not in contact with the rail-shaped stator. The object to be driven is driven by the progressive vibration wave. A movement converting mechanism is provided for the carriage and the driving operations other than the carriage feeding operation are also executed by the vibrator.

The above and other objects and features of the present invention will become apparent from the following detailed description and the appended claims with reference to the accompanying drawings.

DETAILED DESCRIPTION OF THE PREFERRED EMBODIMENTS

Figure 1:
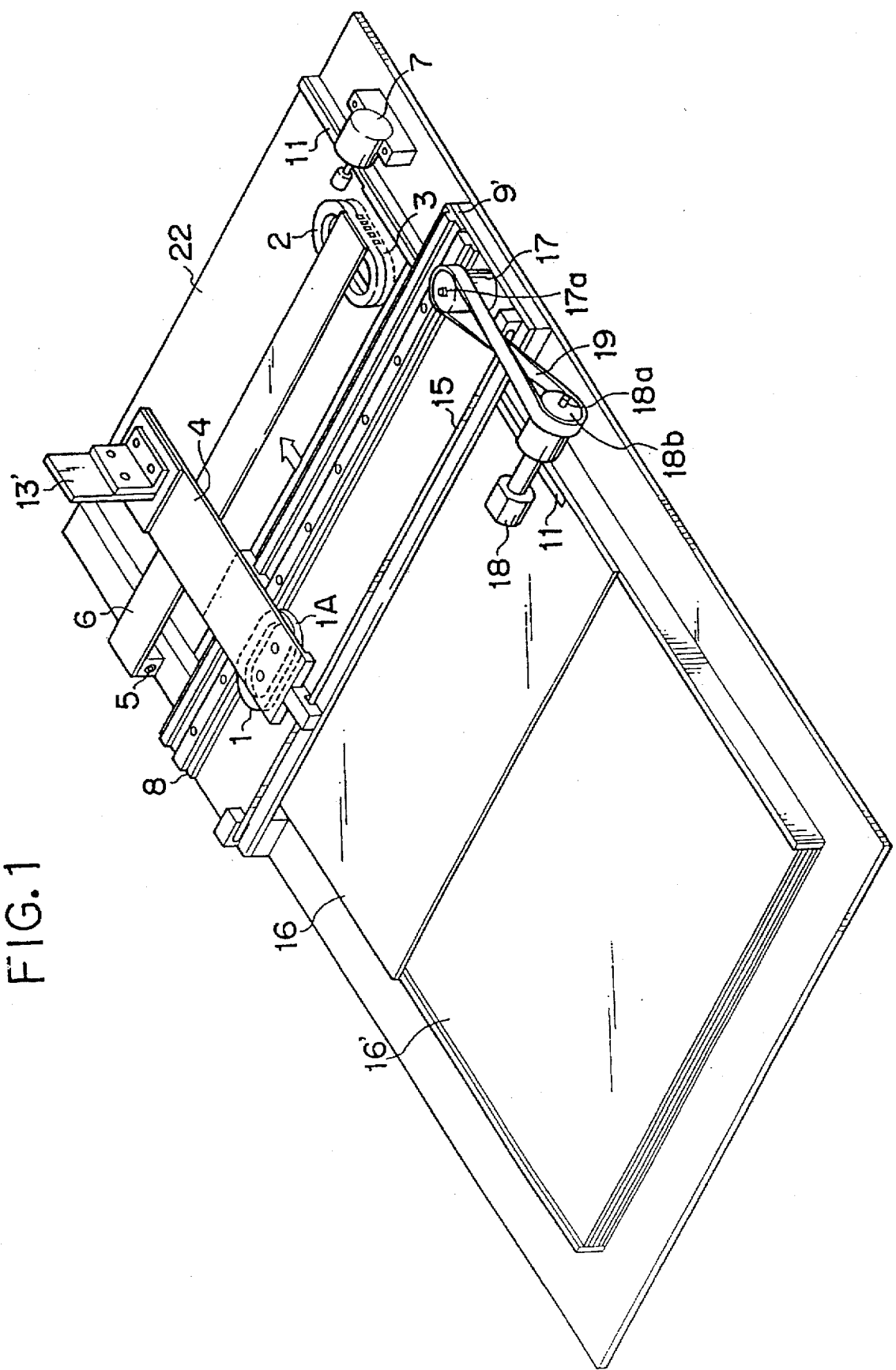
FIG. 1 is a perspective view of a printing apparatus showing the first embodiment of the present invention.

FIG. 1 is a perspective view showing an embodiment of a printing apparatus of a bubble jet type as the thermal jet type according to the present invention. Since the printing apparatus of such a type has been well known in, for example, the foregoing U.S. Pat. Nos. 4,723,129 and 4,740, 796, and the like, its description is omitted here. In FIG. 1, the same constructing portions as those shown in FIGS. 16 to 19 are designated by the same reference numerals. In FIG. 1, reference numerals 1, 2, and 3 denote the vibrators, each constructed of an elastic member and an electric/mechanical energy converting device (e.g., piezoelectric transducer) joined to the elastic member; 4 indicates the carriage; 5 a bearing; 6 a supporting plate; 7 a paper detecting encoder; 8 the rail-shaped stator along which the vibrator 1 moves, which may serve as a contact; 9' a linear guide to guide the carriage 4; 11 a paper guide; 13' a printing head which is mounted on the carriage and is of the foregoing bubble jet type; 15 an encoder scale; 16 the sheet; 16' a group of sheets; 17 a roller which rotates around a shaft 17a; 18 a feed roller; 18b a transfer roller which rotates around a shaft 18a; 19 a belt; 22 a bottom plate of the printer. The roller 17, transfer roller 18b, shaft 18a and belt 19 together serve as a first drive object.

In the above construction, in the paper feeding mode, the carriage feeding vibrator 1 attached to the carriage 4 comes into engagement with the roller 17 which serves as an object to be driven, thereby driving the roller 17. That is, an arc portion side surface 1A of the vibrator 1 is pressed onto the outer peripheral surface of the roller 17, thereby driving the roller 17. A vibration occurring in the vibrator 1 has a torsion in the arc portion although the bending mode is set in a direction that is out of the plane of the vibrator, so that an in-plane component also exists and a driving force is also generated on the side surface 1A. Therefore, the roller 17 rotates around the shaft 17a. The transfer roller 18b rotates around the shaft 18a through the belt 19, thereby rotating the feed roller 18. The feed roller 18 is in contact with the sheet 16. When the feed roller 18 rotates, the sheet 16 is separated from the sheet group 16' and is fed into the printing section. When data is printed onto the sheet 16, a travelling wave is generated in the vibrator 1 by a well-known method. The vibrator 1 is moved from a home position (not shown) to the right along the stator 8. After completion of the printing operation, a wave which progresses in the opposite direction is generated in the vibrator 1, thereby returning the carriage 4 to the home position.

Figure 2:
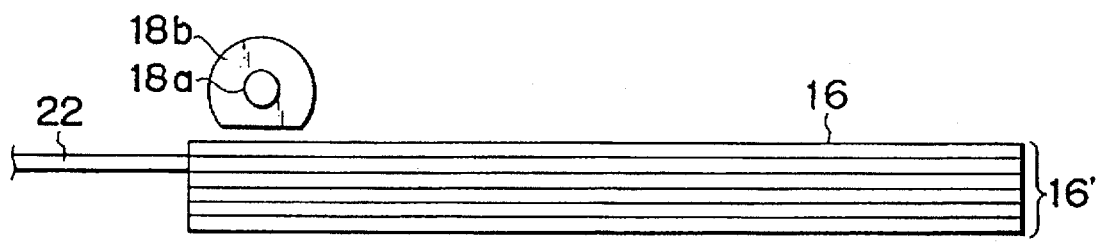
FIG. 2 is a side elevational view of a main section of FIG. 1.
Figure 3:
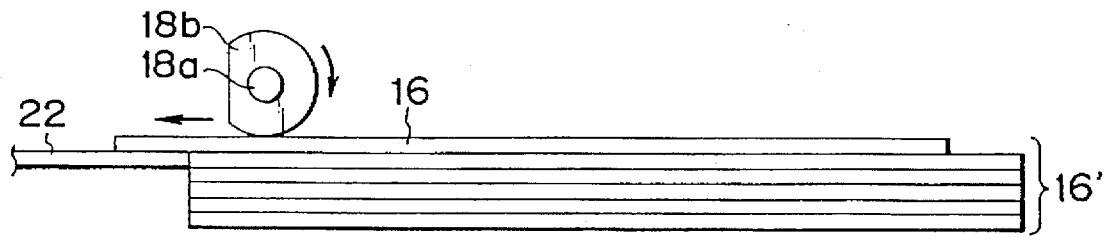
FIG. 3 is a side elevational view of a main section of FIG. 1.

FIGS. 2 and 3 are diagrams when the feed roller 18 is seen from the axial direction. When the feed roller 18 is in contact with the sheet 16, it becomes a load. Therefore, a part of the feed roller 18 is ordinarily cut away. In a mode other than the paper feeding mode, the feed roller 18 is generally away from the sheet 16 as shown in FIG. 2. In the paper feeding mode, the feed roller front edge 18b rotates as shown in FIG. 3, thereby feeding the sheet 16.

Figure 4:
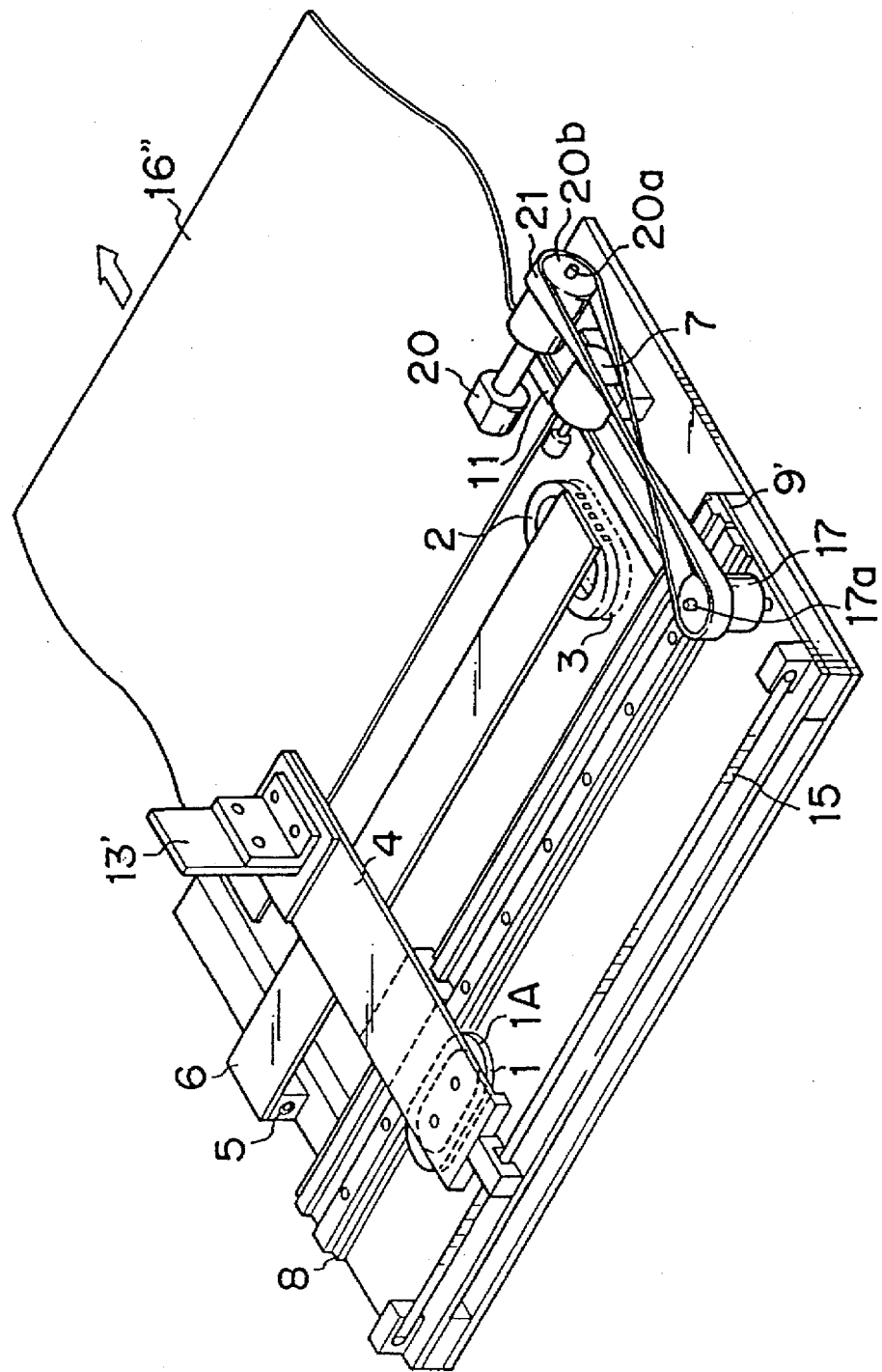
FIG. 4 is a perspective view of a printing apparatus showing the second embodiment of the invention.

FIG. 4 is a perspective view of the second embodiment of a printing apparatus of the present invention. In the embodiment, a paper is delivered by using the vibration of the vibrator. In FIG. 4, the same portions as those shown in FIG. 1 are designated by the same reference numerals. Reference numeral 20 denotes a delivery roller; 20b a transfer roller which rotates around a shaft 20a; and 21 a belt. When the arc portion side surface 1A of the vibrator 1 is come into frictional engagement with the outer peripheral surface of the roller 17 and the roller 17 is rotated, the rotation of the roller 17 is transferred to the delivery roller 20 through the belt 21 and the transfer roller 20b, so that the delivery roller 20 delivers a sheet 16".

Figure 5:
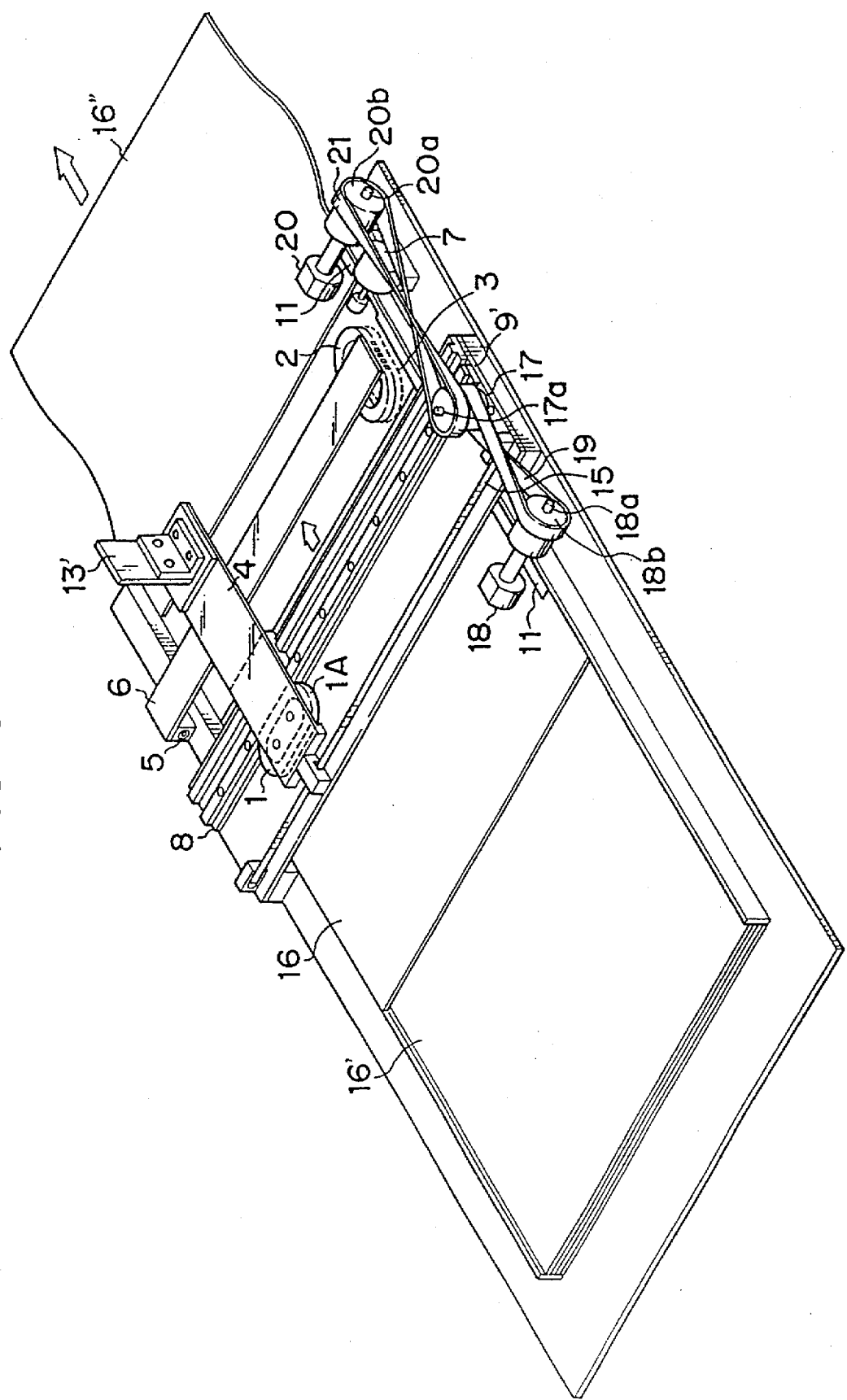
FIG. 5 is a perspective view of a printing apparatus showing the third embodiment of the invention.

FIG. 5 is a perspective view of the third embodiment of a printing apparatus of the bubble jet type of the present invention. In the embodiment, both of the paper feeding operation and the paper delivery operation are executed by using the vibration of the vibrator 1. When the side surface 1A of the vibrator 1 is pressed onto the outer peripheral surface of the roller 17 and the roller 17 is rotated, the rotation of the roller 17 is transferred to the feed roller 18 through the belt 19 and the transfer roller 18b. The sheet 16 is fed to the printing section by the feed roller 18. On the other hand, the rotation of the roller 17 is transferred to the delivery roller 20 through the belt 21 and the transfer roller 20b. The printed sheet 16" is delivered to the outside of the apparatus by the rotating delivery roller 20.

In each of the above embodiments, there is a case where when the vibrators 2 and 3 for feeding the sheet are not driven, it is difficult for the sheet to enter a space between the vibrators 2 and 3 in the paper feeding mode and the sheet is bent. When the paper is delivered to the outside of the apparatus, there is a case where the holding forces of the vibrators 2 and 3 for the sheet 16 are so large that the sheet cannot be pulled out from the space between the vibrators 2 and 3. To prevent such a situation, it is preferable to simultaneously drive the carriage feeding vibrator 1 and the sheet feeding vibrators 2 and 3 in the paper feeding mode or the paper delivery mode.

Further, in the case where a driving circuit for the carriage feed and a driving circuit for the sheet feed are commonly constructed and they cannot be simultaneously driven, it is desirable to alternately switch and drive the two motors by a switch.

In case of a printing apparatus of what is called a low grade such that a high feeding precision is not required, not only in the automatic paper feeding and delivery operations but also in the ordinary sheet feeding operation, the vibrators 2 and 3 are not used but the foregoing mechanism is used, so that the costs can be fairly reduced. In such a case, there is no need to cut away a part of each of the feed roller 18 and the delivery roller 20.

As another embodiment of the present invention, it is also possible to construct in a manner such that the vibration of the vibrator 1 is converted into the rotation and the rotation is transferred to thereby execute the recovery operation of the printing head by a mechanism similar to the above embodiment. A practical construction to realize the above method is not shown in the diagram.

Figure 6:
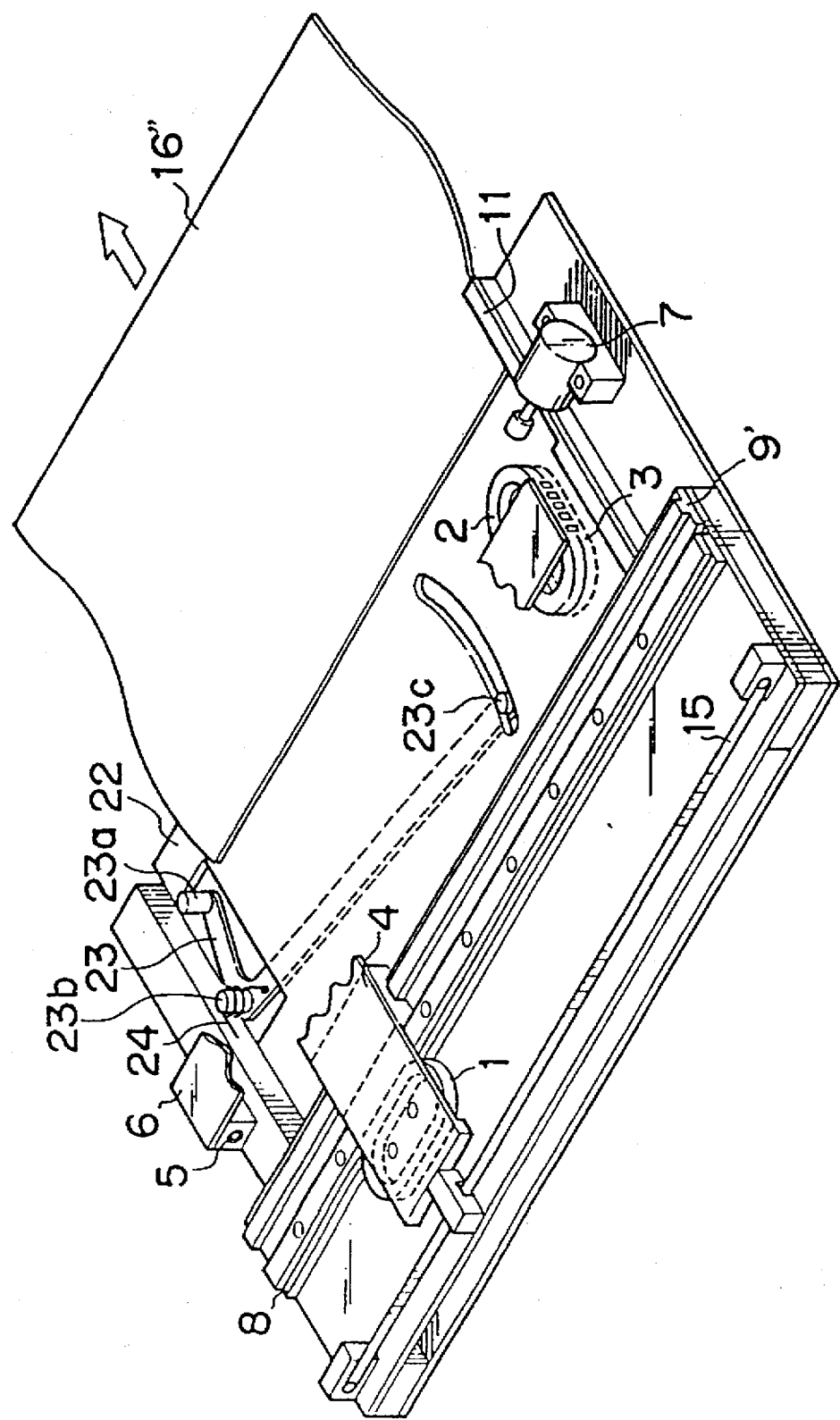
FIG. 6 is a perspective view of a printing apparatus showing the fourth embodiment of the invention.
Figure 7:
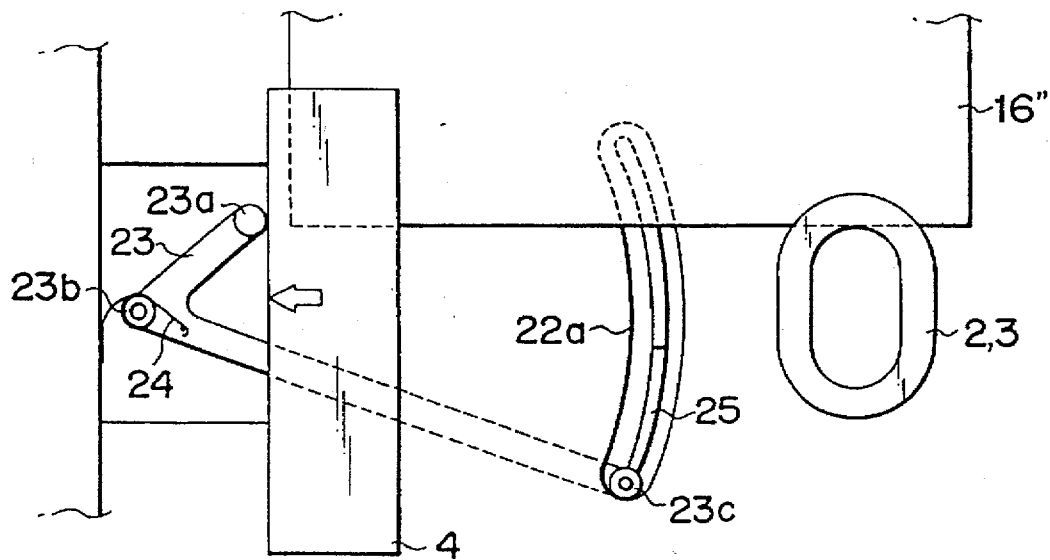
FIG. 7 is a plan view of a main section of FIG. 6.
Figure 8:
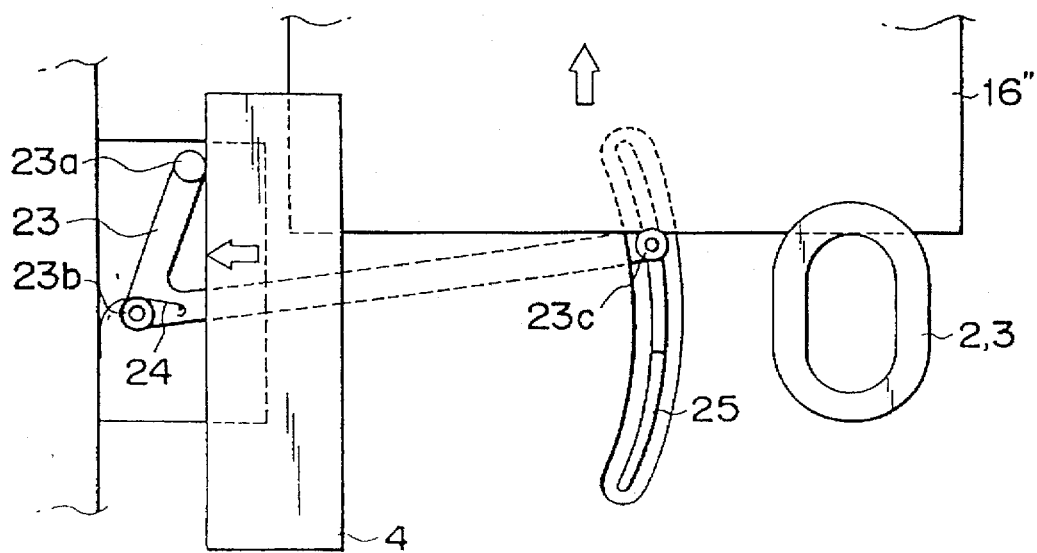
FIG. 8 is a plan view of a main section of FIG. 6.
Figure 9:
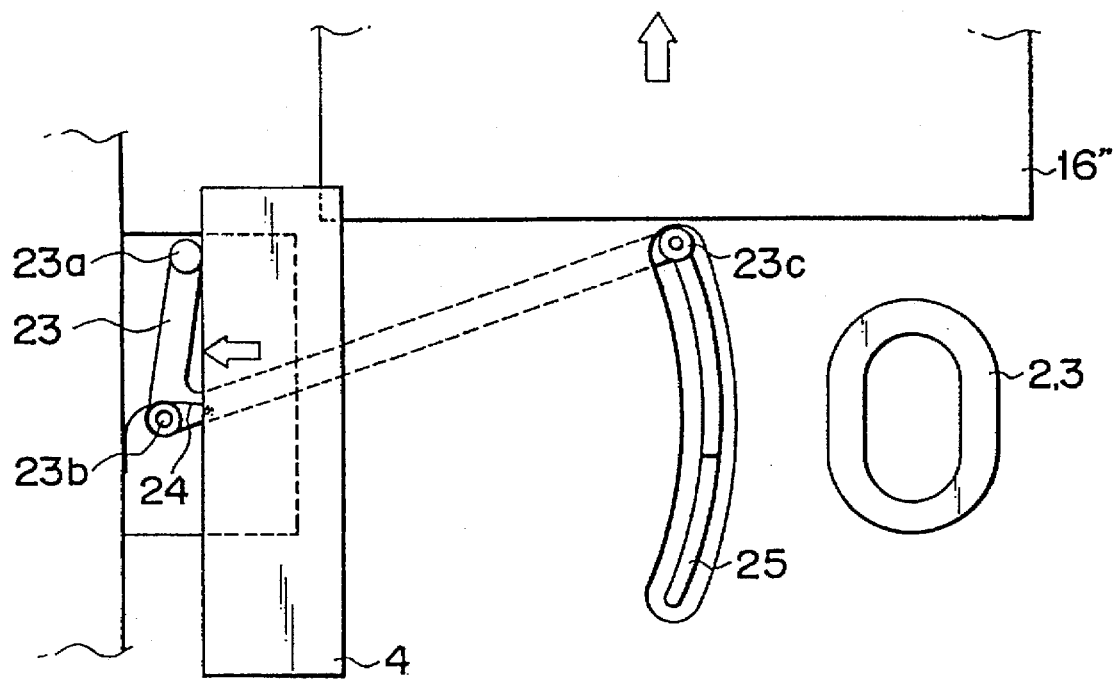
FIG. 9 is a plan view of a main section of FIG. 6.
Figure 10:
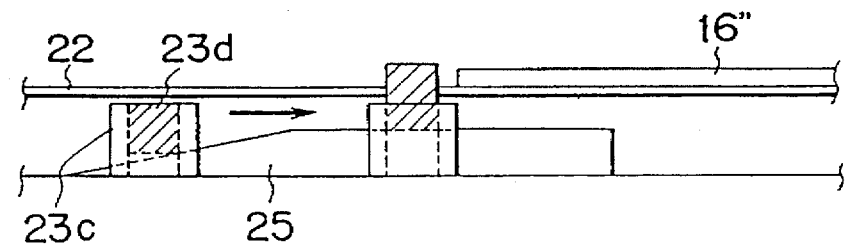
FIG. 10 is a side elevational view of a main section of FIG. 6.
Figure 11:
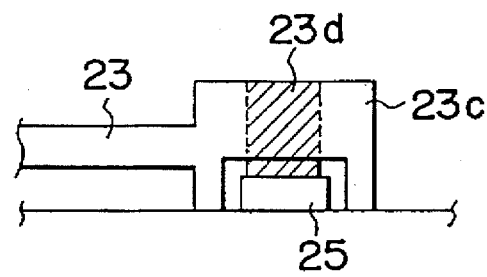
FIG. 11 is a side elevational view of a main section of FIG. 6.

FIG. 6 is a perspective view of a printing apparatus showing the fourth embodiment of the present invention and shows an example in which a delivery lever 23, which may serve as a first load is driven by the vibrator 1 and stator 8 through the carriage 4, which may serve as a connecting member. FIGS. 7 to 9 are plan views of main sections in FIG. 6 and show a state in which the paper is delivered to the outside of the apparatus. FIG. 10 is a side elevational view when the lever 23 for delivery is seen from the right lower position of FIG. 6. FIG. 11 is a side elevational view when the delivery lever 23 is seen from the left lower position of FIG. 6. In those diagrams, the same portions as those shown in FIGS. 1 and 5 are designated by the same reference numerals.

The delivery lever 23 as a motion converting mechanism is provided on the bottom plate 22 of the printing apparatus so as to be rotatable around a second shaft portion 23b. After the vibrator 1 was returned to the home position after completion of the printing operation, the vibrator 1 further moves to the left and enters a delivery locus. Thus, when the carriage 4 pushes a first shaft portion 23a of the lever 23, a third shaft portion 23d moves as shown in FIGS. 7 and 8. The third shaft portion 23d is inserted into a boss portion 23c so as to be vertically slidable. Further, it is prevented that the third shaft portion 23d is pulled out upwardly. The third shaft portion 23d is downwardly pressed by a self-weight or by a spring (not shown) and comes into engagement with a tapered rail 25. The boss portion 23c moves in an arc groove 22a of the bottom plate 22. Therefore, when the lever 23 is rotated by the carriage 4 as mentioned above, in the state shown in FIG. 7, the third shaft portion 23d locating below the bottom plate 22 and sheet 16" ascends while being guided by the tapered rail 25 as shown in FIGS. 10 and 11 and is finally projected to a level higher than the bottom plate 22 and sheet 16" and is come into contact with the sheet 16". When the carriage 4 further presses the first shaft portion 23a, the sheet 16" is released from the vibrators 2 and 3 and is delivered to the outside of the apparatus (refer to FIG. 9). After the paper was delivered, the carriage 4 is away from the first shaft portion 23a. The delivery lever 23 is returned to the state of FIG. 7 by a torsion coil spring 24.

When it is now assumed that a thrust of the vibration driven motor to move the carriage 4 is small and the sheet 16" cannot be released from the vibrators 2 and 3, vibrations are generated in the vibrators 2 and 3 and a holding force of the sheet 16" is reduced and the first shaft portion 23a is pressed, so that the sheet 16" can be delivered to the outside of the apparatus.

Figure 12:
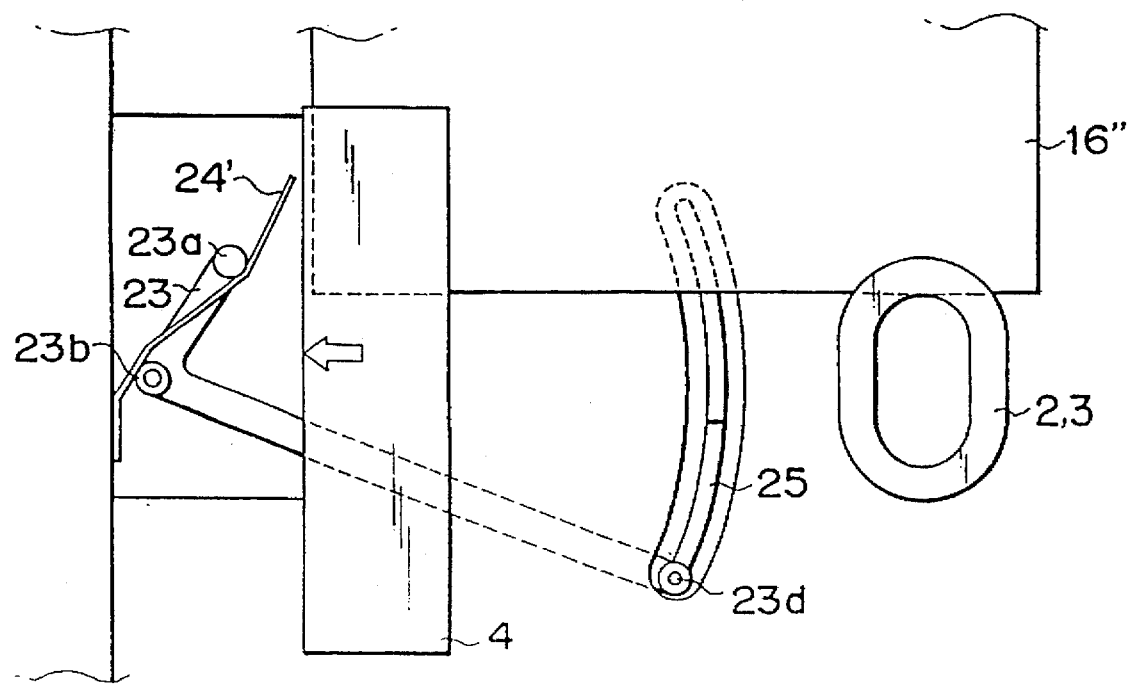
FIG. 12 is a plan view of a main section of a printing apparatus showing the fifth embodiment of the invention.
Figure 13:
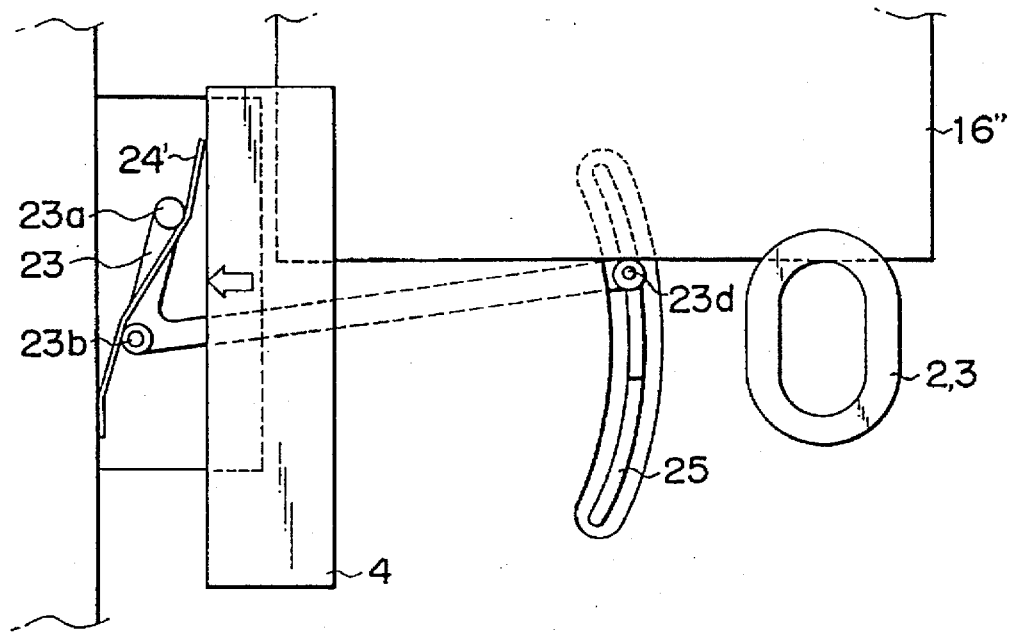
FIG. 13 is a plan view of a main section similar to FIG. 12.
Figure 14:
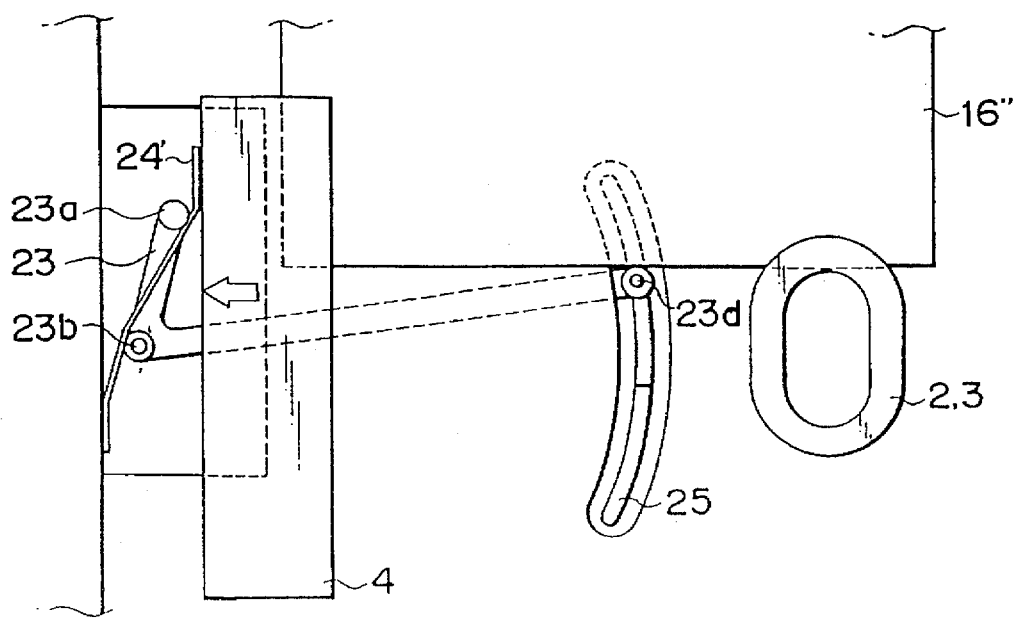
FIG. 14 is a plan view of a main section similar to FIG. 12.
Figure 15:
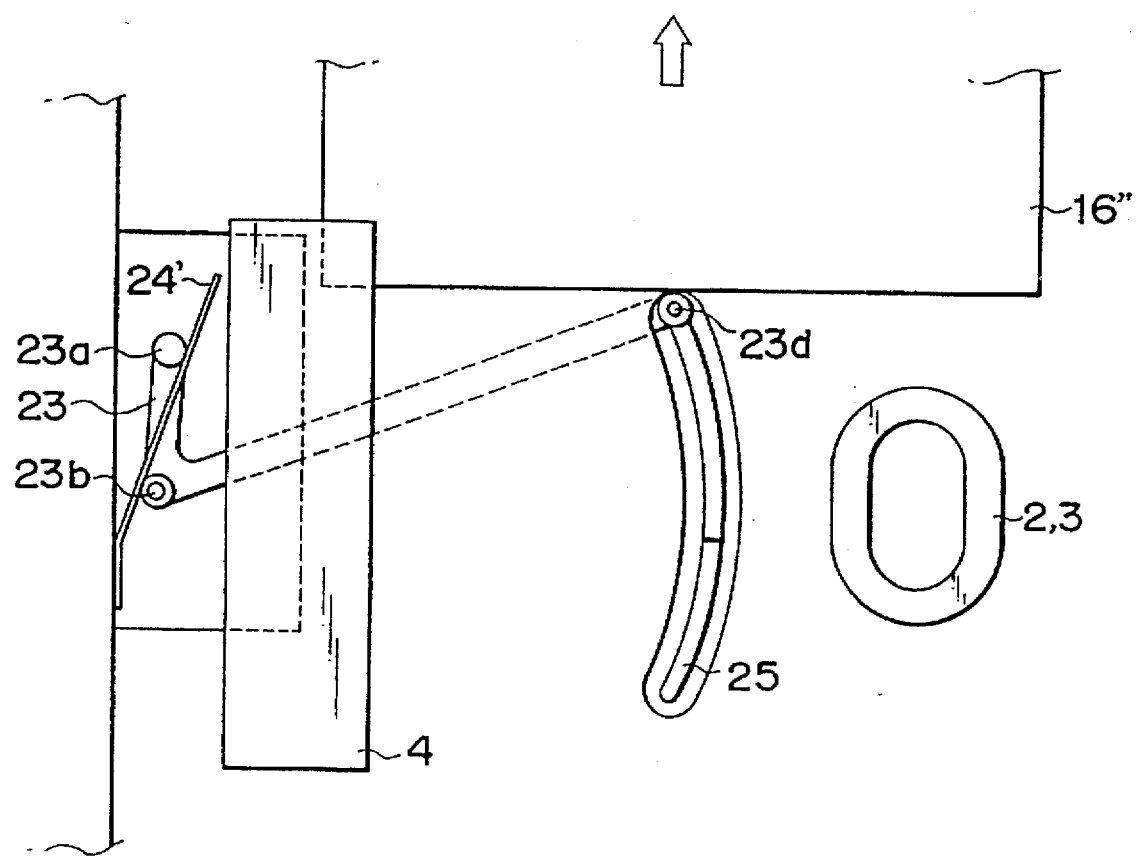
FIG. 15 is a plan view of a main section similar to FIG. 12.
Figure 16:
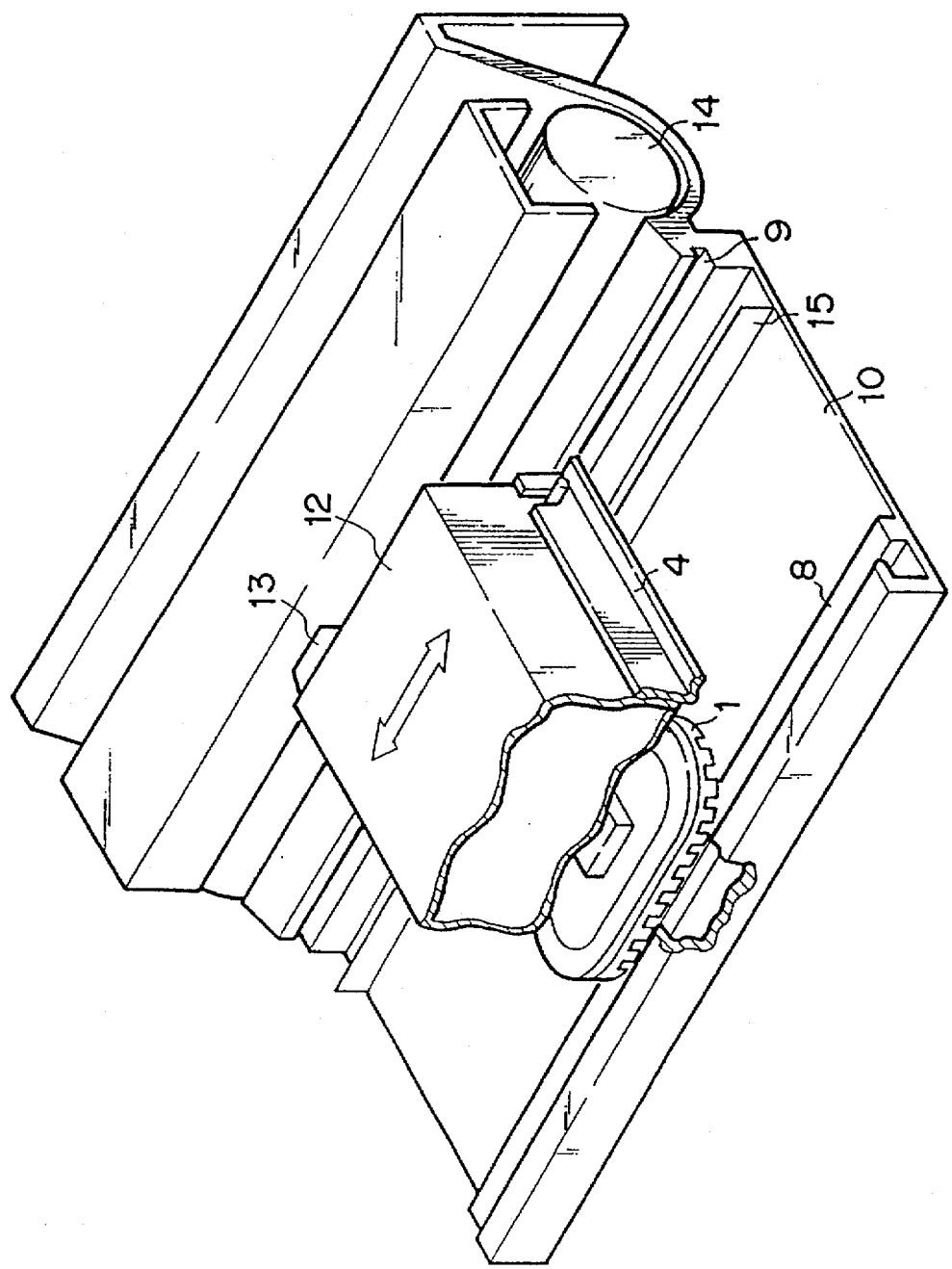
FIG. 16 is a perspective view showing a prior art.
Figure 17:
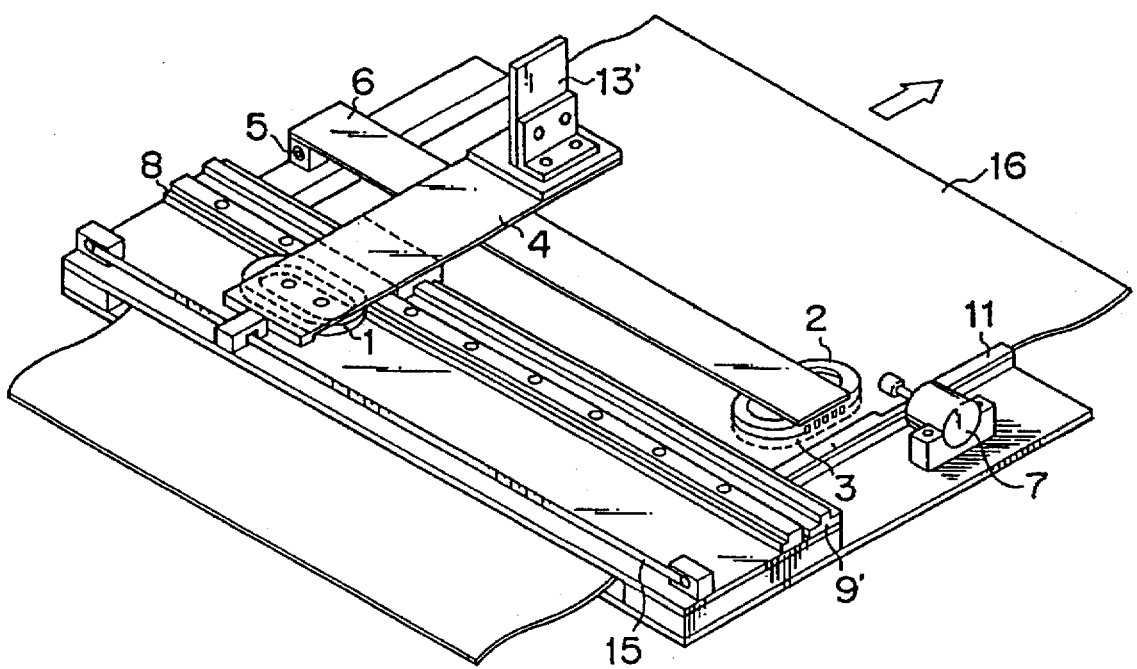
FIG. 17 is a perspective view showing the prior art.
Figure 18:
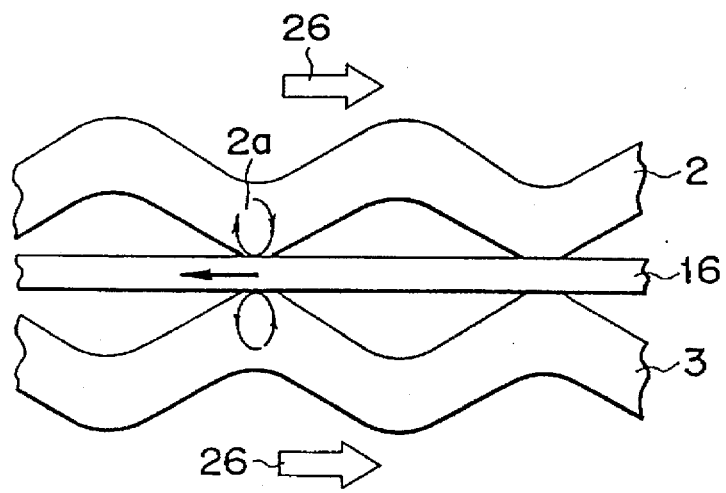
FIG. 18 is a principle diagram of the conveyance of a sheet.
Figure 19:
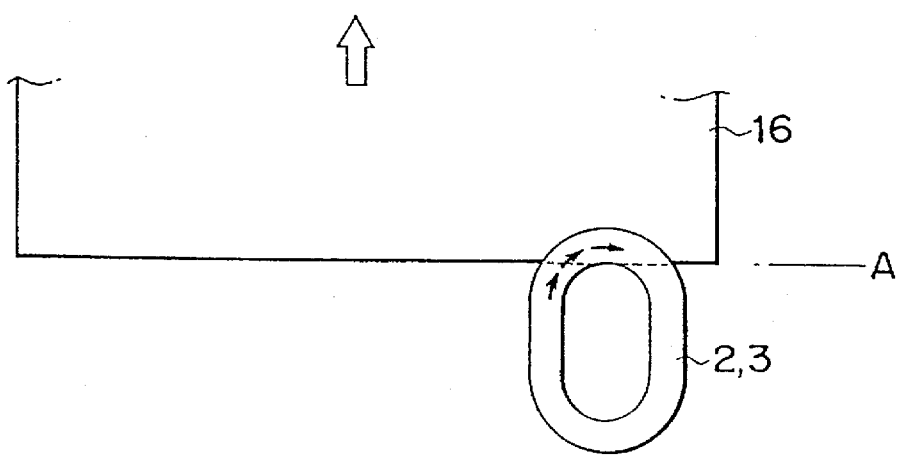
FIG. 19 is a plan view of a sheet feeding portion.

FIGS. 12 to 15 are plan views of main sections of a printing apparatus showing the fifth embodiment of the invention. The embodiment relates to the case where the thrust of the vibration driven motor to feed the carriage is small and driving circuits for the carriage feed and for the sheet feed are commonly constructed and cannot be simultaneously driven. In the embodiment, reference numeral 24' denotes a plate spring whose intermediate portion is supported to the shaft portion 23a and a spring constant is set to a small value. When the carriage 4 presses the delivery lever 23 through the plate spring 24', the third shaft portion 23d comes into contact with the rear edge of the sheet 16" as shown in FIGS. 12 and 13. When the carriage 4 further presses the plate spring 24', as shown in FIG. 14, since the spring force is weak, the delivery lever is not moved by the holding force of the sheet, only the plate spring 24' is warped, and its reaction force is charged. In such a reaction charged state, by continuing or stopping the driving of the carriage feeding motor and by driving the vibrators 2 and 3, the holding force of the sheet 16" is weakened and the sheet can be delivered to the outside of the apparatus by the charged force (FIG. 15). Even in the case where the thrust of the carriage feeding motor is large, when the holding force of the sheet 16" is large, a large force is applied to a position where the third shaft portion 23d is come into contact with the rear edge of the sheet 16", so that there is a case where the sheet is bent. Therefore, it is desirable to use the embodiment. As shown in the fourth embodiment, it is also possible to use the torsion coil spring 24 and to provide a weak spring performance to the member which connects the first shaft portion 23a and the second shaft portion 23b.

In the above embodiments shown in FIGS. 6 to 15, the reciprocating motion of the carriage is converted into another motion. It can be said that the above conversion is equivalent to that the motion of the carriage feeding vibrator 1 is indirectly converted into another motion. Although not shown, the paper feeding operation and the recovery operation of the printing head can be also executed in a manner similar to the lever 23.

According to the present invention as described above, the driving force of the carriage feeding vibrator is also directly used for driving operations other than the carriage feeding operation or the motion of the carriage is converted into another motion and is used for driving operations other than the carriage feeding operation, so that the automatic paper feeding operation, paper delivery operation, and the recovery operation, of the printing head can be executed without using any new actuator.

What is claimed is:

1. A vibration driven printing apparatus, comprising:
   a contact member;
   a vibrating member which has a contact portion in contact with said contact member, said vibrating member for generating a vibration wave to produce a driving force at said contact portion, the driving force causing relative movement between said contact member and said vibrating member;
   a carriage member with a printing head and arranged to engage one of said vibrating member and said contact member and to be displaced by the relative movement between said contact member and said vibrating member; and
   a sheet delivery mechanism engageable with said carriage member and delivering a sheet by the displacement force of said carriage member.

2. An apparatus according to claim 1, wherein said sheet delivery mechanism has a rotatable lever.

3. An apparatus according to claim 1, further comprising a second vibrating member for moving a sheet, wherever said second vibrating member moves said sheet by generating a vibration wave.

4. An apparatus according to claim 3, wherein said second vibrating member generates said vibration wave substantially at the same time as said sheet delivery mechanism is set into the sheet delivery mode.

5. An apparatus according to claim 2, wherein said lever is driven by an urging force of a spring member charged by a movement of said carriage.

6. An apparatus according to claim 2, wherein an operation member for delivering said sheet is displaced in response to the rotation, and thereby said rotatable lever is capable of delivering said sheet.

* * * * *

UNITED STATES PATENT AND TRADEMARK OFFICE
CERTIFICATE OF CORRECTION

PATENT NO. : 5,674,016
DATED : October 7, 1997
INVENTOR(S) : Atsushi KIMURA, et al.

It is certified that error appears in the above-identified patent and that said Letters Patent is hereby corrected as shown below:

Title Page, [57] Abstract, lines 5 and 6, delete "is partially come into" and insert therefor --comes into partial--;
Lines 8 and 9, delete "friction- ally come into" and insert therefor --comes into frictional--.

Column 1, lines 35 and 39, delete "an", both occurrences.

Column 2, lines 22 and 25, delete "is come", both occurrences, and insert therefor --comes--.

Column 3, line 23, after "contact", insert --member--;
Line 27, after "roller", second occurrence, insert --which serves as a second driven object or a second load --.

Column 4, line 5, delete "is come" and insert therefor --comes--.

Column 5, line 24, delete "is come" and insert therefor --comes--.

UNITED STATES PATENT AND TRADEMARK OFFICE
CERTIFICATE OF CORRECTION

PATENT NO. : 5,674,016
DATED : October 7, 1997
INVENTOR(S) : Atsushi KIMURA, et al.

It is certified that error appears in the above-identified patent and that said Letters Patent is hereby corrected as shown below:

Column 6, line 1, delete "is come" and insert therefor --comes--;
         Line 12, delete "to" and insert therefor --so--;
         Line 53, delete "1ever" and insert therefor --lever--.

Signed and Sealed this

Fourteenth Day of April, 1998

*Attest:*

BRUCE LEHMAN

*Attesting Officer*    *Commissioner of Patents and Trademarks*